US010650410B2

(12) United States Patent
Soni et al.

(10) Patent No.: US 10,650,410 B2
(45) Date of Patent: May 12, 2020

(54) SYSTEMS AND TECHNIQUES FOR TARGETING ELECTRONIC COMMUNICATION BASED ON FREQUENCY OF PRODUCT EXPOSURE

(71) Applicant: Adobe Inc., San Jose, CA (US)

(72) Inventors: Sachin Soni, New Delhi (IN); Kevin Smith, Orem, UT (US); Ashish Duggal, Ghaziabad (IN); Anmol Dhawan, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 837 days.

(21) Appl. No.: 15/070,869

(22) Filed: Mar. 15, 2016

(65) Prior Publication Data

US 2017/0270563 A1    Sep. 21, 2017

(51) Int. Cl.
*G06Q 30/02*  (2012.01)
*H04L 29/08*  (2006.01)

(52) U.S. Cl.
CPC ..... *G06Q 30/0255* (2013.01); *G06Q 30/0201* (2013.01); *G06Q 30/0261* (2013.01);
(Continued)

(58) Field of Classification Search
CPC ........... G06Q 30/0255; G06Q 30/0251; G06Q 30/0201; G06Q 30/0261; G06Q 30/0269; G06Q 30/0259; H04L 67/02; H04L 67/12
(Continued)

(56) References Cited

U.S. PATENT DOCUMENTS

2003/0212595 A1*  11/2003  Antonucci ............. G06Q 30/02
                                                        705/14.27
2005/0159993 A1*   7/2005  Kordas ................. G06Q 30/02
                                                        705/38
(Continued)

OTHER PUBLICATIONS

Frost & Sullivan: Digital Proximity Marketing: Short-Range Wireless Technologies Potential Says Frost & Sullivan. Anonymous. M2 Presswire [Coventry] Mar. 9, 2009.*
(Continued)

*Primary Examiner* — Timothy Padot
(74) *Attorney, Agent, or Firm* — Kilpatrick Townsend & Stockton LLP

(57) ABSTRACT

Computer-implemented systems and methods disclosed herein disclose features for determining the frequency of exposure to real-world products embedded with Internet-Of-Things (IoT) hardware and determining a comprehensive targeting profile identifying the interests of users based on their exposure to real-world products. A computing device carried by a user wirelessly receives product exposure data from a nearby IoT-enabled device upon entering within a certain proximity of the IoT-enabled device. The computing device further compiles the product exposure data with previous product exposure data for IoT-enabled devices to which the computing device was previously exposed. Based on the compiled product exposure data, a server device determines a frequency of exposure to a product corresponding to the IoT-enabled device over a period of time. The server device further transmits an electronic communication promoting the product corresponding to the IoT-enabled device if the frequency of exposure increases over a threshold value.

20 Claims, 5 Drawing Sheets

(52) U.S. Cl.
CPC ......... *G06Q 30/0269* (2013.01); *H04L 67/02* (2013.01); *H04L 67/12* (2013.01); *G06Q 30/0251* (2013.01); *G06Q 30/0259* (2013.01)

(58) Field of Classification Search
USPC ....................................................... 705/7.29
See application file for complete search history.

(56) References Cited

U.S. PATENT DOCUMENTS

| | | | |
|---|---|---|---|
| 2007/0239535 A1* | 10/2007 | Koran | G06Q 30/02 705/14.25 |
| 2010/0088154 A1* | 4/2010 | Vailaya | G06Q 10/04 705/7.29 |
| 2014/0244710 A1* | 8/2014 | Sharma | H04L 67/12 709/201 |
| 2016/0156723 A1* | 6/2016 | Seo | H04L 67/148 709/228 |

OTHER PUBLICATIONS

Nomi Enriches Location Marketing Platform With Launch of Proximity Marketing Engine Internet Wire Jan. 9, 2014: NA.*

* cited by examiner

| Sensor ID | Date/Time Stamp | Duration of Exposure | Proximity and Duration Within Certain Threshold? |
|---|---|---|---|
| FITBXYZ12389763WE | 7:00 AM | 2 Minute | No |
| ... | ... | ... | ... |
| ... | ... | ... | ... |
| FITBXYZ12389763FF | 12:00 Noon | 5 Minute | Yes |
| ... | ... | ... | ... |
| ... | ... | ... | ... |
| FITBXYZ12389763XT | 6:00 PM | 10 Minute | No |

Fig. 2

SYSTEMS AND TECHNIQUES FOR TARGETING ELECTRONIC COMMUNICATION BASED ON FREQUENCY OF PRODUCT EXPOSURE

TECHNICAL FIELD

This disclosure relates generally to computer-implemented methods and systems for determining user behaviors and interests based on frequency of product exposure in a real-world venue and targeting users based on the determined interests and behaviors.

BACKGROUND

Digital marketers and other providers of products and services have a need for identifying the interests of potential customers in order to transmit targeted electronic communications that market the products and services. Tracking entities (which include entities such as advertisers, marketers, and other agencies) often track online actions taken by individuals and other entities on websites and other online services. An individual's online shopping history, for example, is tracked to identify the types of products or services the individual is interested in. A tracking entity then transmits targeted communications to individuals according to the identified interests of the individuals. Efficient and personalized tailoring of the content of the communications increases the responsiveness to products presented to the users.

While tracking entities identify interests of potential customers based on information collected on online activity, there is a need for targeting electronic communications based on frequency of real-world product exposure. For example, as an individual commutes from his or her office to home using a public train or subway, the individual is exposed to a variety of products and services. Other individuals on the train may be wearing smart watches, using a recently released smartphone, or using other accessories that are trending in the market. The next morning, the same individual encounters additional instances in the real-world where the same trending products are in use. By continually encountering the same products and accessories while the individual is engaged in real-world activities (as opposed to online activities such as web browsing and online shopping), the individual's interest level in the products naturally rises. An individual who is continually exposed to a recently released and trending smartphone used by the individual's friends and colleagues would also have increased interest level in the new smartphone.

While tracking entities often devote significant resources to analyzing the online activities of individuals and create a detailed digital marketing profile based on such analysis, there is currently no mechanism for detecting the frequency of real-world product exposure and determining user interests based on the frequency of real-world product exposure. One reason for this is that the individual's offline activities often do not involve direct interaction with a computer system, thus making such offline activities difficult to observe, track, record, and analyze which products an individual is exposed to in the real-world. Computing devices, such as smartphones, may provide some insight into an individual's location and thus provide insight into which products to recommend while the user is visiting that location. For example, a tracking entity may determine that an individual is visiting a casino and then use the tracking information to provide targeted communication marketing playing cards or poker chips. However, such geolocation based product targeting cannot capture an individual's interests based on product exposure outside of targeted geographic venues. An individual that plays games of poker on a weekly basis at a friend's home or takes out playing cards when waiting for food at a restaurant demonstrates a high interest in products such as playing cards and poker chips. However, current platforms and techniques for audience management and digital targeting cannot capture these interests that are indicated through patterns of real-world product exposure.

A digital marketing profile that is based only on online activities and geolocation will be less valuable to a tracking entity who wishes to develop a more comprehensive profile for the individual based on the individual's real-world product exposure. Existing digital marketing profiles therefore omit substantial, and potentially valuable, information from the real-world that would provide insight into an individual's interests. Thus, there is a need for systems that determine comprehensive marketing profiles for individuals based on identified patterns of real-world product exposure.

SUMMARY

Systems and methods disclosed herein provide for determining interests of individuals and developing marketing profiles on those individuals based on identified patterns of exposure to Internet-Of-Things (IoT)-enabled products. As an individual travels between various real world locations and engages in activities at different venues (e.g., recreational areas, public transit, the workplace, the home, etc.), the individual enters within proximity of IoT-enabled devices. Upon entering within a certain wireless proximity of an IoT-enabled device, a computing device carried or worn by the individual receives a sensor identifier that identifies the IoT-enabled device. The computing device carried by the individual also determines additional contextual information regarding the exposure with the IoT-enabled device. For example, the computing device determines the amount of time in which the IoT-enabled device was within the proximity of the computing device. The product exposure data (including the sensor identifier identifying the IoT-enabled device and the additional contextual information about the exposure with the IoT-enabled device) is compiled with previous product exposure data for IoT-enabled devices that previously entered within the proximity of the computing device. The compiled product exposure data tracks the instances in which the computing device was exposed to various IoT-enabled devices.

An analytics server analyzes the compiled product exposure data to determine the frequency of exposure to products corresponding to the IoT-enabled devices over a period of time. For example, if the user of the computing device encountered a particular brand of smartphone equipped with IoT hardware X different times while interacting with friends and family over a period of a week, the analytics server determines that the frequency of exposure to the particular brand of smartphone is X Embodiments disclosed herein allow a tracking entity to thus identify how frequently an individual comes into contact with (e.g., enters within a certain wireless proximity of) real-world products that are equipped with IoT hardware. Based on the frequency of exposure for the IoT-enabled devices, the analytics server identifies interests of the user and adds the identified interests to a comprehensive targeting profile. For example, in some embodiments, the analytics server identifies instances where the frequency of exposure to a product corresponding to the IoT-enabled device increases over a threshold value.

Based on the comprehensive targeting profile, the analytics server transmits electronic communications to the computing device, the electronic communications tailored according to the user's interests as identified by real-world product exposure. For example, if the analytics server determines that the frequency of exposure to a product corresponding to an IoT-enabled device is greater than a threshold value, the analytics server transmits an electronic communication including content promoting the product. In some embodiments, the analytics server transmits the electronic communication only if a threshold condition is reached. For example, to avoid over-notifying the user, the analytics server in some instances transmits the electronic communication only if the product corresponding to the IoT-enabled device is on sale within a geographic region of the user. Other threshold conditions are also possible and described in detail further below in the Detailed Description.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

FIG. 2 is a diagram depicting a table that stores historical information on product exposure data collected on IoT-enabled devices that entered within a proximity of a computing device, according to certain embodiments herein.

DETAILED DESCRIPTION

Figure 1:
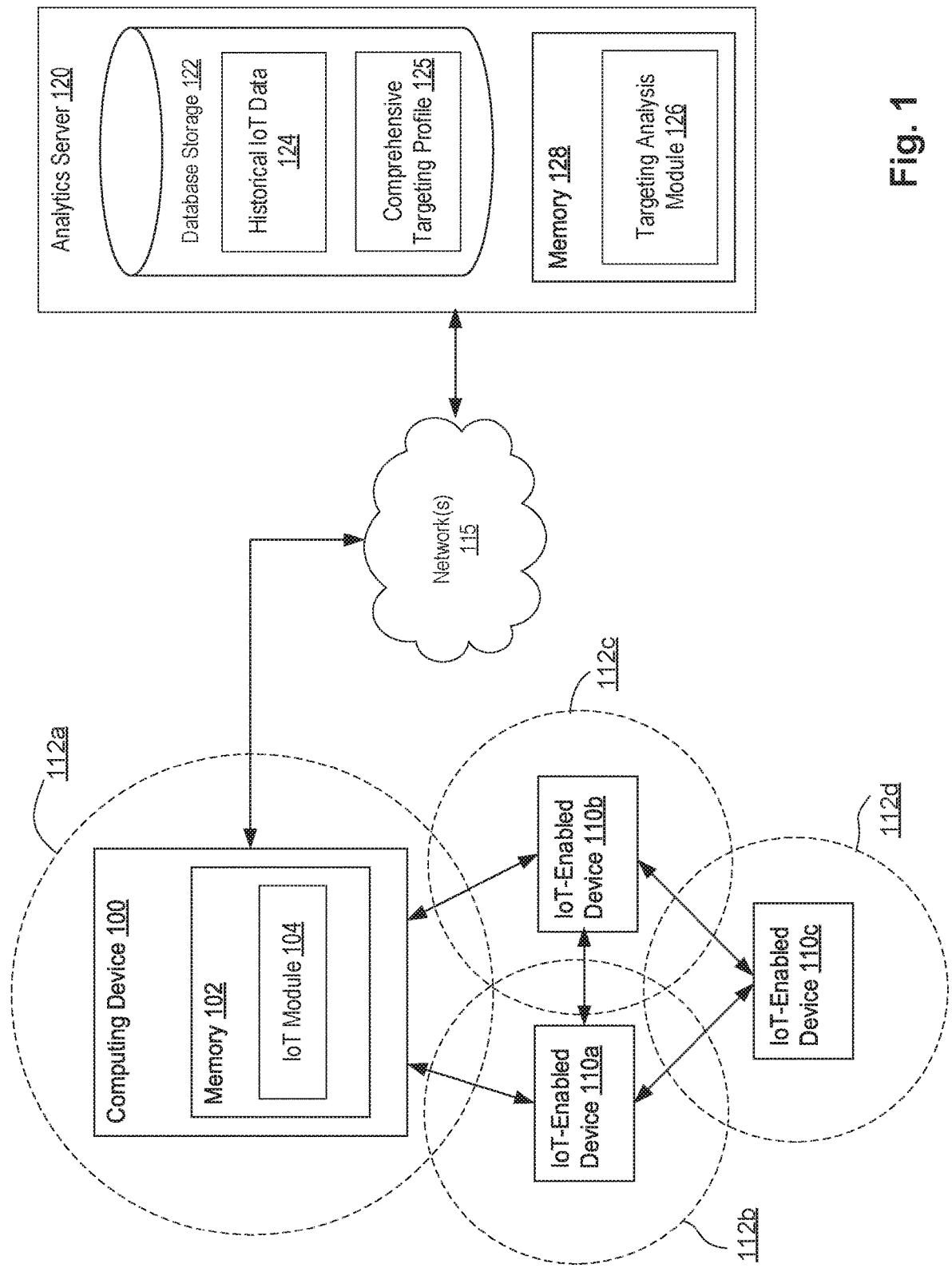
FIG. 1 is a block diagram depicting an example of a system for determining the frequency of exposure to Internet-Of-Things (IoT)-enabled devices and tailoring targeted communications unique to a user based on the frequency of exposure, according to certain embodiments herein.

Computer-implemented systems and methods are disclosed for detecting the products that individuals are exposed to in the real-world and identifying patterns in the exposure to the products. Computer-implemented systems and methods disclosed herein enable tracking entities to develop comprehensive marketing profiles on individuals based on real-world product exposure and thus more accurately tailor and personalize electronic communications for the individuals. Specifically, embodiments disclosed herein utilize Internet-Of-Things (IoT) technology to enable tracking entities to identify the frequency of real-world product exposure and transmit targeted communications tailored for users based on the frequency of the real-world product exposure. The frequency of real world product exposure is based on the number of times a user's smartphone or other computing device carried by the user receives a signal from a product equipped with IoT technology.

For example, many products encountered by the users are equipped or otherwise embedded with IoT sensors or other communication hardware that enable detection and communication with other devices equipped with IoT hardware (herein referred to as IoT-enabled devices). In certain embodiments, the user's smartphone or other computing device continually collects information on IoT-enabled devices that come within a certain proximity of the smartphone or other computing device. Based on the collected information, the frequency of real-world product exposure over a period of time is identified.

For example, as the user enters within a certain proximity of an IoT-enabled device, the smartphone operated by the user communicates with the IoT-enabled device and wirelessly receives product information from the IoT-enabled device. The product information includes a unique sensor identifier that identifies the IoT-enabled device. Software executing on the user's smartphone (herein referred to as an IoT module) determines additional contextual information regarding the exposure of the IoT-enabled device. For example, the IoT module records the specific date and time at which the IoT-enabled device was detected and the duration of time in which the IoT-enabled device was in proximity with the user.

The data derived from the exposure of the IoT-enabled device (e.g., identification of the IoT-enabled device and information regarding the time of exposure and duration of exposure) is compiled with historical data collected on prior exposures of IoT-enabled devices. For example, in some embodiments, the IoT module transmits the identification of the IoT-enabled device and information regarding the time of exposure and duration of exposure to an analytics server executing program code for a targeting analysis module. In other embodiments, the user's smartphone includes the targeting analysis module, which collects and tracks the historical product exposure data providing information on IoT-enabled devices to which the user has been exposed. Using the product exposure data, the targeting analysis module determines how frequently the user is exposed to the IoT-enabled products. For example, if an individual meets with friends on a weekly basis to play a game of poker, the IoT module would detect weekly exposure to IoT-enabled playing cards and poker chips. In another example, if an individual plays golf on a monthly schedule, the IoT module would detect weekly exposure to IoT-enabled golf clubs and golf balls.

The identified frequency of exposure to IoT-enabled product exposure is used by a tracking entity to develop a comprehensive targeting profile that identifies the interests of the individual. For example, a targeting analysis module is software executing on the user's smartphone or other communication device or at an analytics server owned or operated by a tracking entity. The targeting analysis module determines if any of the IoT-enabled devices have an exposure duration greater than a certain threshold value. The targeting analysis module also determines if there is any pattern to the frequency of product exposure (e.g., on a weekly or monthly basis). Determining if there is a pattern to the frequency of exposure helps filter out false negatives—i.e. situations where IoT-enabled devices are continually identified around the user. An example of a false negative would be if the user is continually exposed to IoT-enabled computer mice or keyboards at a work environment. Such continual exposure does not necessarily indicate that the user has an interest in purchasing mice or computer equipment. In some embodiments, the targeting analysis module uses the information on IoT-enabled product exposure in conjunction with additional analytics information compiled on the individual to develop a more complete targeting profile to more accurately tailor content of communications to the individual. For example, in some embodiments, the targeting analysis module uses information compiled on IoT-enabled product exposure along with information on the individual's online activities and geolocation to develop a more comprehensive targeting profile.

Based on the comprehensive profile derived by the targeting analysis module, the tracking entity tailors electronic content that is transmitted to the individual. The tailored electronic content includes targeted information about the IoT-enabled products that the individual has been exposed to with an established pattern in the real-world.

Embodiments disclosed herein thus solve problems inherent with traditional electronic marketing tools that do not take into account real-world product exposure data. By employing the disclosed techniques that identify the frequency and the patterns of real-world product exposure, and using that identification to develop a comprehensive targeting profile, a tracking entity is able to tailor content to individuals based on the exposure of IoT-enabled products. For example, promotional content marketing a set of golf clubs may be transmitted to a smartphone device or other computing device carried by a potential customer based on determining that the potential customer is routinely exposed to the individual brand of golf clubs while playing golf. As another example, promotional content marketing a trending smart watch may be transmitted to a computing device carried by the potential customer based on determining that other individuals the customer routinely interacts with wear the trending smart watch.

As used herein, the term "tracking entity" is used to refer to an organization or individual that tracks and collects data pertaining to characteristics and interactions of tracked entities. Examples of tracking entities include advertisers, retailers, web marketers, financial institutions, and other entities interested in collecting information on end user behavior. Tracking entities utilize one or more aspects of the embodiments herein to develop comprehensive targeting profiles identifying the interests tracked entities.

As used herein, the term "tracked entity" is used to refer to individuals that perform activities that are tracked by tracking entities.

As used herein, the term "IOT-enabled device" is used to refer to any physical product that includes IoT sensors or other hardware that enable communication between other IoT-enabled devices or communication with other devices connected to the Internet. IoT sensors include electronics and hardware that enable communication via a wireless networking protocol, such as but not limited to IEEE 802.11, IEEE 802.15.4, Bluetooth, Near-Field Communication, Extensible Messaging and Presence Protocol, Constrained Application Protocol, and Message Queue Telemetry Transport. IoT-enabled devices include computing devices such as smartphones, tablet computers, and laptop computers, wearable technology such as smart watches, and other products and accessories that include IoT sensors. For example, IoT-enabled devices also include apparel (e.g., shoes, and other clothing) and other retail equipment (e.g., sports equipment such as soccer balls) that are equipped with IoT sensors.

Referring now to the drawings, FIG. 1 is a block diagram depicting a computing environment in which a computing device 100 detects and communicates with nearby IoT-enabled devices 110a-c and also communicates with an analytics server 120 over a network 115. Computing device 100 includes any personal computing device carried or worn by an individual user and that is capable of IoT communication. Examples of computing device 100 include smartphones, tablet computers, and wearable devices and accessories that include IoT sensors. The computing device 100 includes a memory 102 that stores executable program code for performing certain operations described herein. For example, memory 102 includes program code for execution of an IoT module 104 for communicating with nearby IoT-enabled devices 110a-c. IoT module 104 may be implemented as various forms of program code to receive and process communications from nearby IoT-enabled devices 110a-b. In one example, the IoT module 104 is implemented as a standalone background application that receives and transmits communications with nearby IoT-enabled devices 110a-b and transmits communications to the analytics server 120 over network 115. In another example, the IoT module 104 is part of a larger program that is executing in the computing device 100. For example, the computing device 100 executes third party applications such as media applications, location tracking applications, and other applications, some of which are provided by a tracking entity. The IoT module 104 in some embodiments comprises add-on functionality provided by a software development kit (SDK) that interfaces with said third party applications, enabling the third party applications to communicate with nearby IoT-enabled devices 110a-b and with analytics server 120.

Computing device 100 communicates with the analytics server 120 via network 115, which includes the Internet and also includes local intranets or other suitable communication networks. In some embodiments, the analytics server 120 is owned or operated by a tracking entity that determines targeting profiles for groups of users and transmits promotional content to the users based on identified interests in the targeting profiles.

As described above, the user of computing device 100 continually encounters various products in the real-world, products used by other individuals such as family, friends, and coworkers. Many products the user of computing device 100 is exposed to include IoT-enabled devices 110a-c. Through embodiments described herein, tracking entities identify how frequently the user of computing device 100 encounters IoT-enabled devices 110a-c and uses the frequency of the product exposure to help define a comprehensive targeting profile for the user.

IoT-enabled devices 110a-c are equipped with IoT-sensors that enable communication between nearby IoT-enabled devices or enable communication via the Internet. Similarly, computing device 100 is equipped with an IoT sensors that enables communication with IoT-enabled devices 110a-c. In some instances, computing device 100 and IoT-enabled devices 110a-c communicate when within a certain proximity of each other. The distances in which computing device 100 and IoT-enabled devices 110a-c are able to communicate are shown as regions 112a-d. In the example embodiment depicted, IoT-enabled devices 110a-c are within communication proximity of each other (as shown by regions 112b-d) and are thus able to communicate with each other. Computing device 100 is within communication proximity of IoT-enabled devices 110a-b but not IoT-enabled device 110c. An example of such an embodiment is a situation where a user of computing device 100 is at a park or other recreational area and passes near other users of the park that are using IoT-enabled devices 110*a-b*. As computing device 100 enters within communication proximity of IoT-enabled devices 110*a-b*, computing device 100 wirelessly communicates with IoT-enabled devices 110*a-b*. Specifically, IoT-enabled devices 110*a-b* provide sensor identifiers identifying the IoT-enabled devices 110*a-b*.

The proximity in which computing device 100 and IoT-enabled devices 110*a-c* communicate varies depending on the device and the specific configuration of the device. For example, an IoT-enabled device 110 that is a soccer ball is configured to detect and communicate with other IoT-enabled devices 110 utilized by all players in a playing field. Thus, an IoT-enabled device 110 such as a soccer ball is configured with IoT hardware sensors that allow for communication across a field (e.g., via Bluetooth, 802.11 communication, or other medium range wireless networking). In contrast, an IoT-enabled device 100 that is a playing card or a poker chip requires less communication range and is thus configured with IoT hardware sensors that allow for communication with nearby players (e.g., individuals seated across a game table). A non-limiting example of such IoT hardware sensors include hardware for Near Field Communication (NFC). Thus, the maximum ranges 112*a-d* in which computing device 100 and IoT-enabled devices 110*a-c* communicate are determined on the hardware configuration and communication capabilities of the individual devices.

The sensor identifiers received from IoT-enabled devices 110*a-b* are unique identifiers that identify the type of product and the brand or manufacturer of the IoT-enabled devices 110*a-b* (e.g., identifies if the IoT-enabled device 110 is a beach umbrella, an article of clothing, a computing device such as a smartphone or wearable computing device, etc.). In some embodiments, the sensor identifiers received from IoT-enabled devices 110*a-b* correspond to serial numbers or other product numbers identifying the product. In other embodiments, the sensor identifiers correspond to unique signatures for the IoT hardware embedded within IoT-enabled devices 110*a-b*.

In some embodiments, communication between computing device 100 and IoT-enabled devices 110*a-b* occurs automatically as the computing device 100 enters within wireless proximity range of IoT-enabled devices 110*a-b* (e.g., as the region 112*a* of computing device 100 enters within regions 112*b-c* of IoT-enabled devices 110*a-b*. For example, the IoT module 104 includes a background process executing in the computing device 100 that detects beacons or other periodic signals intermittently transmitted by IoT-enabled devices 110*a-b*. Upon detecting the beacons or other periodic signals, the IoT module 104 further receives signals carrying the sensor identifiers as part of a synchronization process between computing device 100 and IoT-enabled devices 110*a-b*.

Upon receiving sensor identifiers from the IoT-enabled devices 110*a-b*, IoT module 104 determines additional product exposure data providing contextual details regarding the exposure to IoT-enabled devices 110*a-b*. For example, IoT module 104 determines the date and time in which the sensor identifiers were received and the specific proximity to the IoT-enabled device. In some embodiments, the IoT module 104 communicates with a geolocation module to determine the geographic location of the computing device 100 at the time the sensor identifiers were received from IoT-enabled devices 110*a-b* (via GPS, triangulation via cellular towers, and other suitable mechanisms for detecting geographic location). The IoT module 104 further determines the duration in which the computing device 100 was exposed to IoT-enabled devices 110*a-b* (i.e. determines how long the computing device 110 was within IoT range of IoT-enabled devices 112*b-c*). For example, the IoT module 104 further records the time at which the computing device 100 exits the proximity of IoT-enabled devices 110*a-b* and determines the duration of exposure by comparing the time at which sensor identifiers were received with the time at which the computing device 100 exited the proximity of IoT-enabled devices 110*a-b*. In some embodiments, the IoT module 104 determines if the IoT-enabled device 110*a* was demoed or otherwise displayed to a user of computing device 100 by determining if a proximity value of the IoT-enabled device 110*a* is less than a particular threshold for more than a threshold amount of time.

The IoT module 104 transmits the product exposure data (which includes the sensor identifiers received from IoT-enabled devices 110*a-b* and also includes the additional contextual information regarding the exposure of IoT-enabled devices 110*a-b* as described above) to the analytics server 120 via network 115. The analytics server 120 includes one or more computer servers that include or have access to a database storage 122 for storing historical IoT data 124 (e.g., information regarding IoT exposure received by computing device 100 and tracked over time). The analytics server 120 also includes a memory 128 that stores executable program code for performing certain operations described herein. For example, memory 128 includes program code for execution of a targeting analysis module 126. The targeting analysis module 126 provides instructions for receiving IoT product exposure data from computing device 100, compiling the product exposure data with the historical IoT data 124, and determining frequency of exposure of IoT-enabled devices 110*a-b* to develop comprehensive targeting profile for the user of computing device 100.

Upon receiving the product exposure data from computing device 100, the targeting analysis module 126 compiles the received data with historical product exposure data previously received from computing device 100. A table showing example entries for compiled exposure data regarding the exposure to numerous IoT-enabled devices is shown in FIG. 2 below. Historical IoT data 124 in some embodiments is unique to the user of computing device 100 and in other embodiments unique to the computing device 100, allowing a tracking entity to develop a targeting profile on either the user or on the computing device 100.

To develop or add to a comprehensive targeting profile that identifies the interests of the user of computing device 100, the targeting analysis module 126 analyzes the compiled product exposure data (stored as the historical IoT data 124) to determine the number of sensor identifiers that correspond to a given IoT-enabled device 110. For example, in some embodiments, partner product companies that manufacture or sell an IoT-enabled device 110 provide a list of all sensor identifiers that correspond to the IoT-enabled device 110 (e.g., by providing a list of all serial numbers for IoT-enabled device 110). In other embodiments, partner product companies that manufacture or sell an IoT-enabled device 110 provide application programming interfaces (APIs) to communicate with computing devices for the partner product companies (not shown in FIG. 1). In these embodiments, the targeting analysis module 126 invokes or otherwise calls functions of an API to transmit a given sensor identifier to a computing device owned or operated by a partner product company. The targeting analysis module 126 receives a response from the partner product company confirming whether the given sensor identifier belongs to an IoT-enabled device 110 that was manufactured or sold by the partner product company. The targeting analysis module 126 also receives information from the partner product company indicating what type of product the IoT-enabled device 110 is (e.g., an article of clothing, a computing device, a vehicle, etc.).

For every IoT-enabled device 110 detected in the historical IoT data 124, the targeting analysis module 124 determines the number of times that the IoT-enabled device 110 was exposed to the computing device 100. In one embodiment, the targeting analysis module 124 clusters all sensor identifiers corresponding to an IoT-enabled device 110 together and calculates the number of sensor identifiers in the cluster. For example, user of computer device 100 meets with colleagues during the workday that use a particular laptop that is trending in the market (i.e. the IoT-enabled devices 110*a-b*). The individual laptops include different serial numbers, and these serial numbers (sensor identifiers) are transmitted to computing device 100 via the process described above. Once received by the analytics server 120, the serial numbers are included in the historical IoT data 124 for the computing device 100 or for the user of computing device 100. Upon analyzing the historical IoT data 124, the targeting analysis module 126 confirms the product for which the sensor identifiers belong (either by comparing the sensor identifiers with a list provided by manufacturer or seller of the laptops or by communicating with the manufacturer/seller of the product via an API as described above). The targeting analysis module 126 further determines that the computing device 100 was exposed to at least two laptops of the given manufacturer and brand. In this way, the targeting analysis module 126 determines the frequency of exposure of real-world products (i.e. of IoT-enabled devices 110) as the real world products enter within a proximity of computing device 100.

Depending on the product that is the IoT-enabled device 110, the targeting analysis module 126 implements different rules to determine if the amount of interaction/exposure with the IoT-enabled device 110 is sufficient to count as positive exposure that should be included in determining the frequency of exposure. For example, for an IoT-enabled device 110 that is trending smart watch in the market, the targeting analysis module 126 may determine that an instance where the computing device 100 enters within five feet of the smart watch and remains within five feet for a period of 20 seconds or more is considered a valid interaction. Based on such a rule, the targeting analysis module 126 determines that the frequency of exposure for the smart watch is the number of times that the IoT-enabled device 110 (e.g., the trending smart watch) remains within a five-foot proximity of the computing device 100 for a period of 20 seconds or more. The rules for determining the frequency of exposure vary depending on the type of product comprising the IoT-enabled device 110.

Based on the frequency of the IoT-enabled device exposure, the targeting analysis module 126 transmits targeted electronic communication to computing device 100. For example, in some embodiments, if the frequency of exposure of the IoT-enabled device 110 is determined to be greater than a threshold value, the targeting analysis module 126 transmits electronic communication including content promoting the IoT-enabled device 110. Electronic communication including the promotional content includes, for example, email messages, text messages, notifications on a user application (e.g., a pop-up notification on an application executing on computing device 100), and other notifications. The promotional content includes information such as advertisements and offers unique to the location of computing device 100. In this way, the targeting analysis module 126 is able to target user of computing device 100 based on the products that the user is exposed to and interacts with in the real world.

In some aspects, the frequency of product exposure indicates the amount of interest that the user of computing device 100 has in the given product. The targeting analysis module 126 uses the data generated on the frequency of product exposure to build a or add to an existing comprehensive targeting profile 125 for the user of computing device 100. The comprehensive targeting profile 125 is stored in database storage 122 and allows a tracking entity (via analytics server 120) to target users for specialized electronic communications/marketing material uniquely tailored for that user. The comprehensive targeting profile 125 is a data structure that stores the interests, interactions, and behaviors of the user of computing device 100. For example, a comprehensive targeting profile 125 includes information on the frequency of product exposure the computing device 100 is exposed to over a period of time. In some embodiments, the frequency of product exposure is one factor among multiple data variables that define the interests and activities of the user. For example, in some embodiments, the comprehensive targeting profile 125 also includes collected information on the demographics of the user (e.g., age, gender, and other attributes), online interactions of the user (e.g., indicating the types of products the user of computing device 100 purchases on the Internet on various tracking entity websites), and the geographic location of the user. The targeting analysis module 126 adds information indicating the frequency of product exposure (i.e. frequency of exposure to IoT-enabled devices 110*a-b*) to the comprehensive targeting profile 125 for the user.

As the computing device 100 is exposed to more real-world devices and collects sensor identifiers from various IoT-enabled devices 110, the computing device 100 continues to transmit the product exposure data to analytics server 120. The targeting analysis module 126 continues to refine historical IoT data 124, providing more accurate information on the day to day products to which the user is exposed. Based on the product exposure information data collected over time and stored as historical IoT data 124, the targeting analysis module 124 determines patterns in when, how often, for what duration the computing device 100 enters within the proximity of IoT-enabled devices 110*a-b*. For example, targeting analysis module 124 analyzes the historical IoT data 124 to determine that user of computing device 100 is exposed to IoT-enabled poker cards on a weekly basis. As another example, targeting analysis module 124 determines that user of computing device 100 is exposed to IoT-enabled wearable devices (e.g., pedometers and smart watches) worn by other individuals every morning (e.g., as the user of computing device 100 engages in a daily morning run at a local park).

In determining the frequency of product exposure via the historical IoT data 124 and the patterns thereby determined as described above, the targeting analysis module 126 further filters the data to reduce the occurrence of false positives. For example, in a situation where IoT-enabled devices are commonplace and can be found in shoes and other articles of clothing, in standard computer equipment such as computer mice or keyboards, etc., not every frequently occurring device will be of interest to the user of computing device 100. In these instances, the targeting analysis module 126 transmits targeted electronic communication comprising promotional content for the IoT-enabled device 110 only if a threshold condition is satisfied.

For example, in some embodiments, the targeting analysis module 126 only transmits electronic communications promoting an IoT-enabled device 110 if the IoT-enabled device 110 is currently trending in the market (i.e. if the IoT-enabled device has been purchased by other users within the geographic area of computing device 100 in amounts greater than a threshold number). When a popular smartphone is released, for example, fans of the smartphone drive up sales of the smart watch, indicating that the smartphone is trending in the market. The targeting analysis module 126 in this example only transmits electronic communications promoting the smart watch if the number of sales in the geographic region of the computing device 100 are greater than a threshold value (which can be modified by the tracking entity).

In another embodiment, the targeting analysis module 126 limits electronic communications about a particular type of IoT-enabled device 110 to a certain number of times per time period. For example, the targeting analysis module 126 only transmits electronic communication promoting an IoT-enabled device 110 an X number of times per day. If electronic communication promoting the IoT-enabled device 110 has already been transmitted a certain number of times per given time period, the targeting analysis module 126 waits until the next time period (e.g., the next day) to transmit the electronic communication.

In another embodiment, the targeting analysis module 126 only transmits electronic communications promoting an IoT-enabled device 110 according to user configurations specified by the user of the computing device 100. For example, IoT module 104 receives instructions from the user via a user interface indicating how often to receive electronic communications and what types of products that the user should receive electronic communications about (e.g., what types of products the user is interested in). The targeting analysis module 126 only transmits electronic communications about the IoT-enabled device 110 if transmittal of such communication satisfies the instructions provided by the user of computing device 100.

In another embodiment, the targeting analysis module 126 only transmits electronic communications promoting an IoT-enabled device 110 if the IoT-enabled device 110 is on sale within a geographic location of the computing device 100.

In another embodiment, the targeting analysis module 126 only transmits electronic communications promoting an IoT-enabled device 110 if the user of computing device 100 triggers the electronic communication. For example, as the computing device 100 is exposed to a variety of IoT-enabled devices 110 and the frequency of such exposure increases, the targeting analysis module 126 determines the most frequently occurring IoT-enabled devices 110 to which the computing device 100 is exposed. Upon a user interface selection at the computing device 100 (e.g., the user opening an application or selecting an input that requests promotional content for nearby IoT-enabled device 110), the computing device 100 transmits the user interface selection to the analytics server 120. In response, the comprehensive targeting profile 126 transmits an electronic communication that includes promotional content about the most frequently occurring IoT-enabled devices 110 at the time of receiving the user interface selection. The targeting analysis module 126 thus transmits electronic communication regarding the IoT-enabled devices 110 to which the user has been recently and frequently exposed.

While targeting analysis module 126 and database storage 122 comprising the historical IoT data 124 and comprehensive targeting profile 125 is shown as being implemented in an analytics server 120 for illustrative purposes, in other embodiments, one or more of these modules are included in the computing device 100. Specifically, in some embodiments, the targeting analysis module 126 is program code stored in memory 102 and executes alongside the IoT module 104 to determine the frequency of exposure to IoT-enabled devices 110 and provide relevant notifications to the user of computing device 100 based on the identified frequency of exposure. Similarly, in some embodiments, the historical IoT data 124 tracking the various occurrences of product exposure data or the comprehensive targeting profile 125 are stored in a storage of the computing device 100. As such, the computing device 100 operates as a standalone device that identifies the frequency of exposure to IoT-enabled devices 110 as the user is exposed to/interacts with IoT-enabled devices and determines targeted notifications for the user based on the frequency of the exposure.

As explained above, the historical IoT data 124 is used to derive the frequency of exposure of IoT-enabled devices 110. In some embodiments, the historical IoT data 124 is stored in a table identifying the detected sensor identifiers and other product exposure data related to the exposure. FIG. 2 depicts a table 200 that stores information for historical IoT data 124. The analytics server 120 maintains the tracked sensor identifiers and product exposure data for a configurable duration per every tracked user.

Column 210 in table 200 depicts the various sensor identifiers that are collected from nearby IoT-enabled devices 110 once the IoT-enabled devices enter within a certain proximity of the computing device 100. Along with the sensor identifier, the IoT module 104 also transmits to analytics server 120 other product exposure data that provides contextual information on the exposure of the IoT-enabled device 110. Columns 220-240 provide examples of this additional product exposure data. Specifically, column 220 lists the specific time and date in which the IoT-enabled device entered within a wireless proximity of the computing device 100, column 230 lists the duration of time for which the IoT-enabled device 110 was within a wireless proximity of the computing device, and column 240 identifies whether the proximity of the IoT-enabled device and the duration of exposure was within a certain threshold.

The information in column 240 provides an indication, to the targeting analysis module 126, whether the user of computing device 100 interacted with the IoT-enabled device 110. For example, if the duration of exposure was greater than or equal to five minutes and the proximity of the IoT-enabled device 110 during the period of exposure was within a certain threshold (e.g., within 1 meter), it is likely that the user of computing device 100 used or otherwise operated or demoed the IoT-enabled device 110. An example such an interaction is when the user of computing device 100 temporarily utilizes to demo a friend's smartphone or other IoT-enabled device 110. Based on the indication in column 240, a tracking entity further refines the interests of the user to determine the content that should be sent in targeted electronic communication.

For example, as referred to above with respect to FIG. 1, the targeting analysis module 126 implements different rules to determine if the amount of interaction/exposure with the IoT-enabled device 110 is sufficient to count as positive exposure that should be included when determining the frequency of exposure. In this example, the targeting analysis module 126 determines the number of times the user of computing device 100 interacted with or otherwise demoed a given IoT-enabled device 110 by determining the number of positive hits in column 240. Based on this information, the targeting analysis module 126 determines the frequency in which a user is not only exposed to, but temporarily interacts with an IoT-enabled device 110 not otherwise owned or operated by the user, providing a tracking entity valuable information about the user's interests as the user interacts with products in the real-world.

As another example of an embodiment in which the targeting analysis module 126 implements rules to determine the amount of interaction and exposure with IoT-enabled devices 110, consider a user of computing device 100 who is at a consumer electronic trade show surrounded by numerous IoT-enabled devices 110*a-c* that are being demoed by various companies. As the user, who is carrying computing device 100, attends different product booths to interact with and test a subset of the products (e.g., interacting with only IoT-enabled devices 110*a-b*), the IoT module 104 executing in computing device 100 receives sensor identifies for IoT-enabled devices 110*a-b*. Specifically, the IoT module 104 receives the sensor identifier when the IoT-enabled devices 110*a-b* enter within wireless proximity of the computing device 100. As the user interacts with the IoT-enabled modules 110*a-b*, the IoT module 104 detects that proximity of each IoT-enabled devices 110*a-b* is within a certain threshold and further determines that the IoT-enabled devices 110*a-b* remain within the threshold proximity for a minimum duration. By analyzing the product exposure data collected by the IoT module 104, the targeting analysis module 126 determines that frequency of interactions from the user with the IoT-enabled devices 110 during the trade show. If, for example, the user demoed/interacted with IoT-enabled devices 110 that are smartphones and did not interact with other devices at the trade show, the targeting analysis module 126 determines that the user has a high interest level in smartphones.

Figure 3:
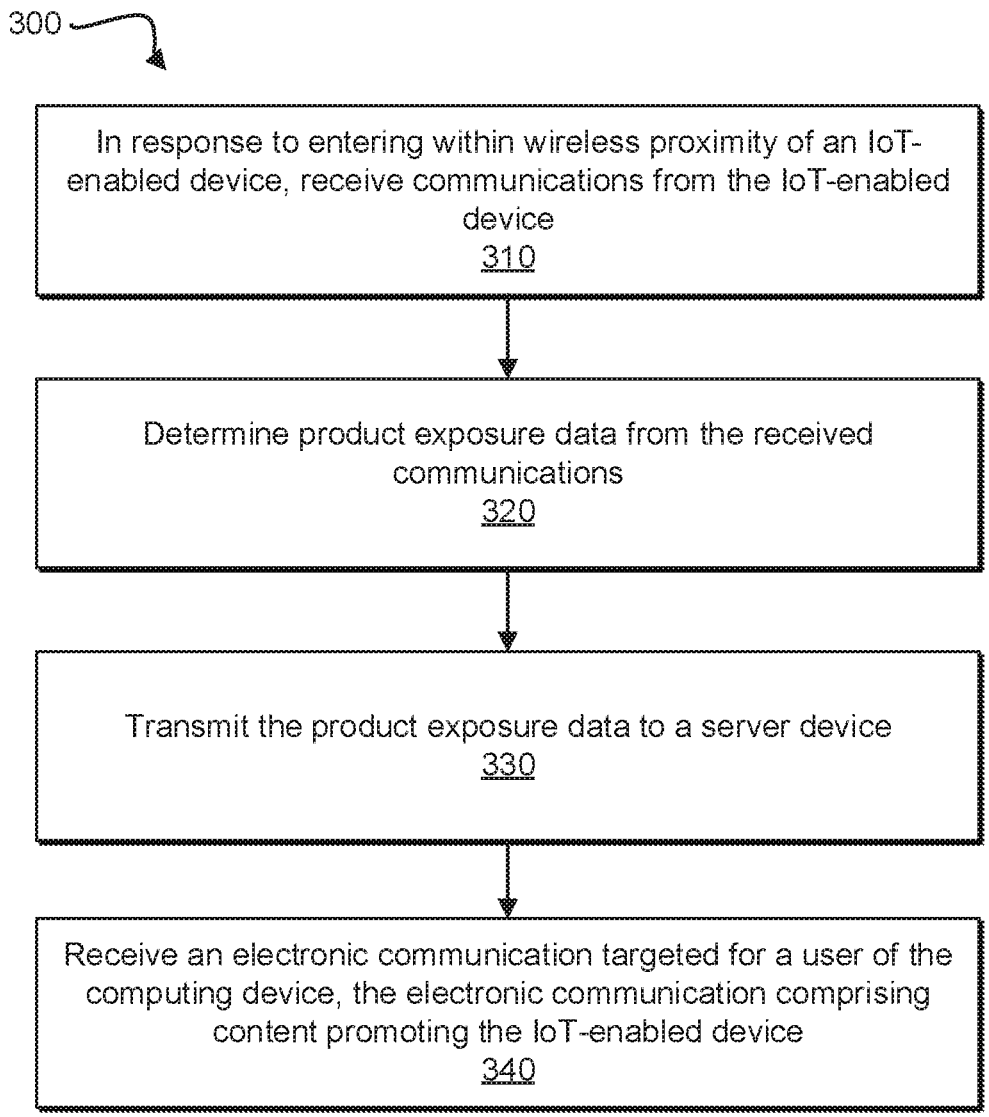
FIG. 3 is a flowchart depicting an example process for receiving targeted communication based on exposure to nearby IoT-enabled devices, according to certain embodiments herein.

FIG. 3 is a flowchart depicting an example process 300 for receiving targeted communication based on exposure of nearby IoT-enabled devices. The process 300 may be performed by one or more of the components listed in FIG. 1 or in any suitable computing and/or communication environment.

In step 310, the process 300 includes, in response to entering within wireless proximity of an IoT-enabled device, receiving communications from the IoT-enabled device. For example, as the user of the computing device 100 travels in the real world and encounters IoT-enabled devices 110*a-c* around the user, an IoT module 104 executing within the computing device 100 listens for beacons or other wireless communications from IoT-enabled devices 110 that enter within proximity of the computing device 100. Once the computing device 100 enters within a wireless proximity of an IoT-enabled device 110 (e.g., computing device 100 entering within proximity of IoT-enabled devices 110*a-b* as shown in regions 112*a-c*), the IoT module 104 receives communications at least comprising sensor identifiers identifying the IoT enabled devices 110*a-b*.

The process 300 further includes determining product exposure data from the received communications, as shown in block 320. For example, the IoT module 104 determines the amount of time the computing device 100 remains within proximity of the IoT-enabled device 110. The product exposure data includes the sensor identifier received from the IoT-enabled device 110 and the duration information indicating the amount of time in which the IoT-enabled device 110 was within proximity of the computing device 100. In some embodiments, the product exposure data also includes the date and time the sensor identifier was received. In additional embodiments, the product exposure data also includes an indication as to whether the proximity and duration of the exposure of the IoT-enabled device 100 was within certain minimum thresholds.

The process 300 further involves transmitting the product exposure data to a server device, as shown in 330. For example, the computing device 100 transmits the product exposure data to the analytics server 120 via network 115. A targeting analysis module 126 compiles the product exposure data with previous product exposure data collected for multiple IoT-enabled devices to which the computing device 100 was previously exposed. For example, the targeting analysis module 126 compiles the received product exposure data with previous product exposure data stored as historical IoT data 124. Based on the compiled product exposure data, the targeting analysis module 126 determines the frequency of exposure to products corresponding to the IoT-enabled devices over a period of time. The frequency of exposure to a product corresponding to an IoT-enabled device refers to the number of times in which the computing device 100 received sensor identifiers from a particular brand and type of product enabled with IoT hardware over a period of time, even though the exposure was to different instances of that particular product. For example, if the computing device 100 enters within wireless proximity to X different instances of a particular brand and type of smartphone over the course of a month, according to embodiments herein the computing device 100 receives sensor identifiers from each instance of the smartphone (X different times). The frequency of exposure to the particular brand and type of smartphone (i.e. the product corresponding to the IoT-enabled device) is X.

The process 300 further involves receiving an electronic communication targeted for a user of the computing device, the electronic communication comprising content promoting the product corresponding to the IoT-enabled device, as shown in block 340. For example, once the frequency of exposure to the product corresponding to IoT-enabled device 110 increases over a threshold value (the threshold value being a configurable setting at the targeting analysis module 126), the targeting analysis module 126 transmits electronic communication that targets the user of computing device 100 by providing content that is tailored to the unique interactions of the user with IoT-enabled devices 110. The corresponding threshold value that defines when electronic communication should be received is configurable for each type of IoT-enabled device 110. Thus, the threshold value in some embodiments is based on a product category for the IoT-enabled device 110. For example, an IoT-enabled device 110*a* that is a smart watch has a lower corresponding threshold value compared to an IoT-enabled device 110*b* that is an article of clothing.

In additional embodiments, the targeted electronic communication is only received if the IoT-enabled device 110 satisfies at threshold condition. Examples of threshold conditions include if the IoT-enabled device 110 has been purchased a minimum number of times within a geographic region of the user, if the content promoting the IoT-enabled device 110 has already been received by the computing device 110, and if the IoT-enabled device 110 is on sale within a geographic location of the user.

Figure 4:
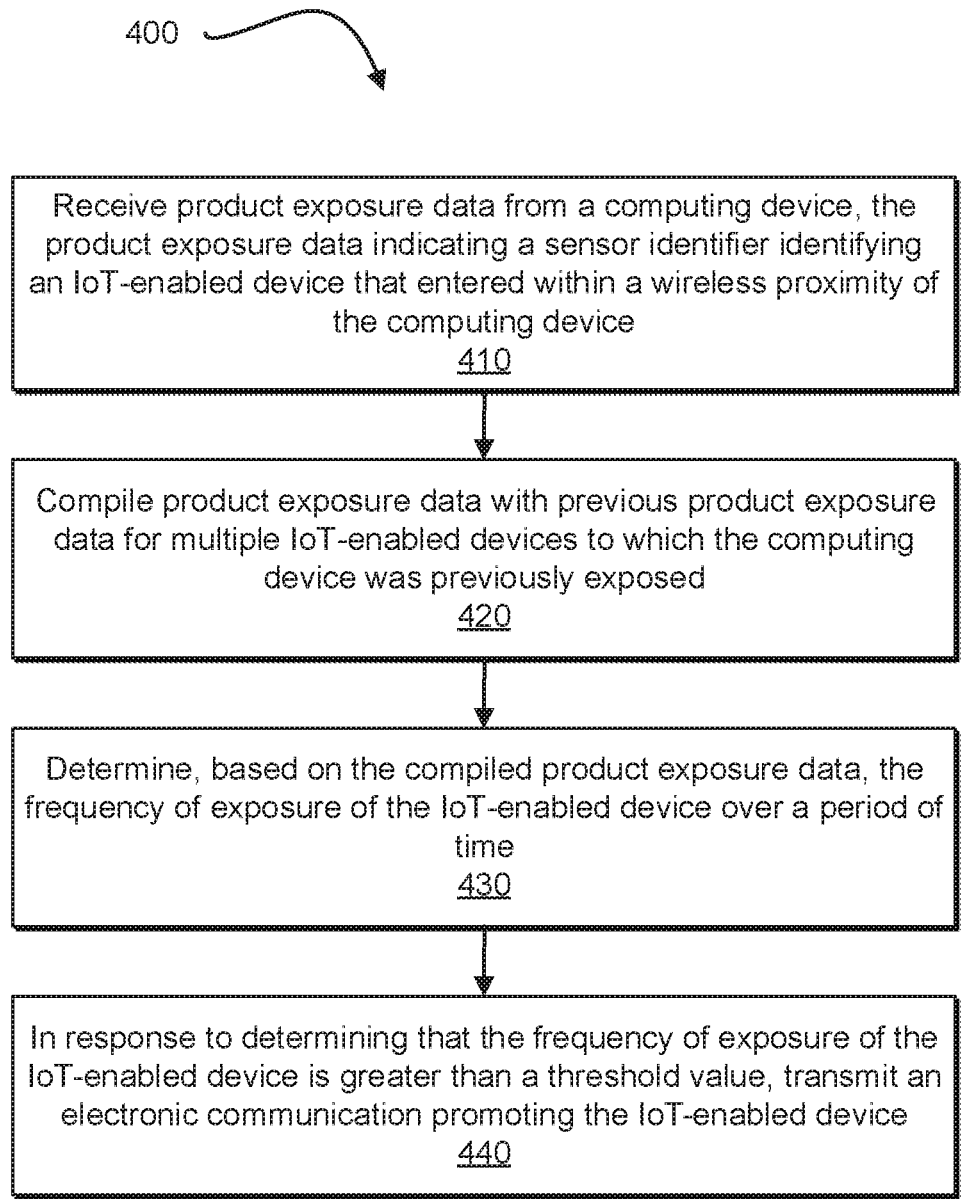
FIG. 4 is a flowchart depicting an example process for determining the frequency of exposure of IoT-enabled devices and transmitting targeted communication based on the frequency of exposure, according to certain embodiments herein.

As described above, a targeting analysis module 126 (which executes in an analytics server 120 or in computing device 100) determines the frequency of exposure of IoT-enabled devices and transmits targeted communication to the computing device based on the frequency of exposure. FIG. 4 is a flowchart showing example process 400 for transmitting a targeted communication based on the frequency of exposure to IoT-enabled devices.

The process 400 starts with block 410, in which the targeting analysis module 126 receives product exposure data from a computing device. The product exposure data includes a sensor identifier identifying the IoT-enabled device that entered within a wireless proximity of the computing device. The product exposure data also includes duration information indicating an amount of time in which the IoT-enabled device was within proximity of the computing device. For example, as discussed in detail in FIGS. 1 and 3, the analytics server 120 receives the product exposure data from computing device 100.

The process 400 further includes compiling the product exposure data with previous product exposure data for multiple IoT-enabled devices to which the computing device was previously exposed, as shown in block 420. For example, targeting analysis module 126 compiles the product exposure data with previous product exposure data stored as historical IoT data 124, discussed above with reference to FIGS. 1 and 2.

The process 400 further includes determining, based on the compiled product exposure data, a frequency of exposure to a product corresponding to the IoT-enabled device over the period of time, as shown in block 430. The period of time is a configurable setting input into the target analysis module 126. To determine the frequency of exposure, the tracking analysis module 126 determines the number of entries of the compiled product exposure data (e.g., the number of entries in table 200) that include sensor identifiers corresponding to the IoT-enabled device 110. For example, if the computing device 100 enters within proximity of eight IoT-enabled devices that are a particular type of smartphone, each with a different sensor identifier such as a different serial number), the targeting analysis module 126 determines that the frequency of exposure for the particular type of smartphone is eight.

In some embodiments, a high frequency of exposure (e.g., a frequency of exposure higher than a certain threshold value) indicates a growing interest level in the IoT-enabled device 100. The targeting analysis module 126 determines or adds to a comprehensive targeting profile 125 for the user by adding an indication of the interest in the IoT-enabled device 100 to the comprehensive targeting profile 125. The comprehensive targeting profile 125 is used to collect and track the interests of the user and other analytics information on the user.

The process 400 also includes, in response to determining that the frequency of the exposure to a product corresponding to the IoT-enabled device is greater than a threshold value, transmitting an electronic communication promoting the IoT-enabled device, as shown in block 440 and discussed in detail in with reference to block 340.

Figure 5:
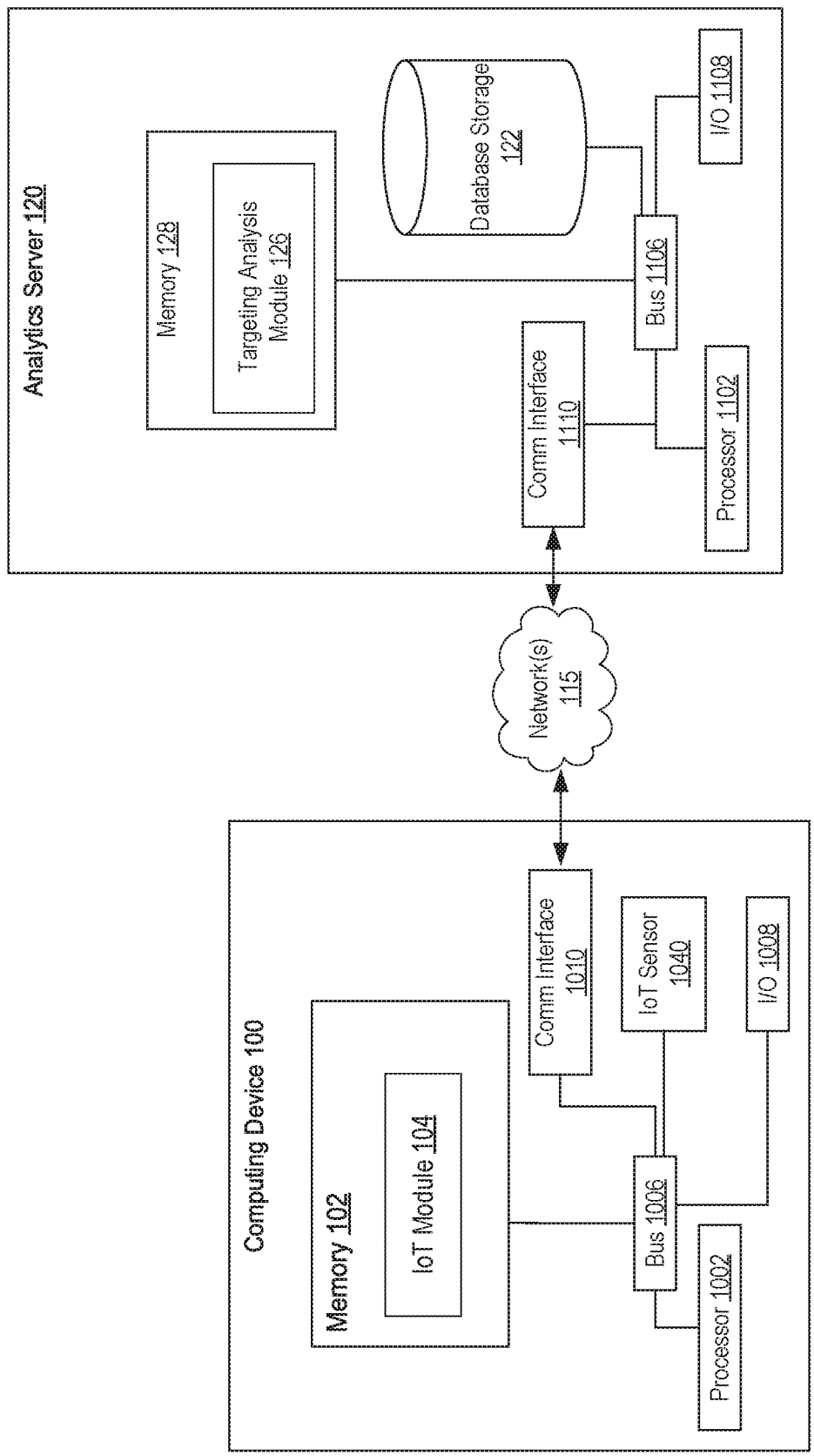
FIG. 5 is a block diagram depicting example hardware implementations for the components described in FIG. 1.

Any suitable computing system or group of computing systems can be used to implement the computing device 100 and analytics server 120. For example, FIG. 5 is a block diagram depicting examples of implementations of such components. The computing device 100 includes a processor 1002 that is communicatively coupled to the memory 102 and that executes computer-executable program code and/or accesses information stored in the memory 102. The processor 1002 comprises, for example, a microprocessor, an application-specific integrated circuit ("ASIC"), a state machine, or other processing device. The processor 1002 includes one processing device or more than one processing device. Such a processor is included or may be in communication with a computer-readable medium storing instructions that, when executed by the processor 1002, cause the processor to perform the operations described herein.

The memory 102 includes any suitable non-transitory computer-readable medium. The computer-readable medium includes any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions include processor-specific instructions generated by a compiler and/or an interpreter from code written in any suitable computer-programming language, including, for example, C, C++, C #, Visual Basic, Java, Python, Perl, JavaScript, and ActionScript.

The computing device 100 also comprises a number of external or internal devices such as input or output devices. For example, the mobile computing system 100 is shown with an input/output ("I/O") interface 1008 that receives input from input devices or provide output to output devices. The computing device 100 also includes an IoT sensor 1040. IoT sensor 1040 includes, for example, hardware for detecting and communicating with IoT-enabled devices 110*a-c*. A bus 1006 is also included in the mobile computing system 100. The bus 1006 communicatively couples one or more components of the mobile computing system 100.

The computing device 100 executes program code that configures the processor 1002 to perform one or more of the operations described above. The program code includes the IoT module 104. The program code is resident in the memory 102 or any suitable computer-readable medium and is executed by the processor 1002 or any other suitable processor. In additional or alternative embodiments, one or more modules are resident in a memory that is accessible via a data network, such as a memory accessible to a cloud service.

The computing device 100 also includes a network interface device 1010. The network interface device 1010 includes any device or group of devices suitable for establishing a wired or wireless data connection to one or more data networks 115. Non-limiting examples of the network interface device 1010 include an Ethernet network adapter, a modem, and/or the like. The computing device 100 transmits messages as electronic or optical signals via the network interface device 1010. For example, the computing device 100 transmits communication including the device engagement data and changes in device engagement data throughout playback of the video advertisement, as described above with reference to FIGS. 1-4, to analytics server 120 via network 115.

While example embodiments provided herein depict computing device 100 as a type of mobile computing device such as a smart phone for illustrative purposes, in other embodiments, computing device 100 is any IoT-enabled device that communicates with adjacent IoT-enabled devices that are within a certain proximity. In one example, computing device 100 is an IoT-enabled device with an embedded processor (e.g., processor 1002), a memory 102 storing instructions for an IoT module 104, and an IoT sensor 1040.

Similar to the computing device 100, the analytics server 120 also includes a processor 1102, I/O interface 1108, communication interface 1110, and memory 128 communicatively coupled via a bus 1106. The memory 128 includes non-transitory computer-readable memory as described above and stores program code defining operations of the analytics server 120. The processor 1102 executes the computer-executable program code and/or accesses information stored in the memory 128. For example, the analytics server 120 includes memory 128 that stores program code for the targeting analysis module 126. Upon execution by processor 1102, the program code for the targeting analysis module 126 performs the steps and functions for described above with respect to FIGS. 1-4.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A computer-implemented method for receiving a targeted communication on a computing device based on exposure to nearby IoT-enabled devices, the method comprising:
   detecting, at the computing device, an IoT-enabled device entering within a wireless proximity of the computing device, wherein the wireless proximity comprises a communication range of a wireless networking protocol;
   in response to the computing device entering within a wireless proximity of an IoT-enabled device, wirelessly receiving, at the computing device, communications from the IoT-enabled device, the communications including at least a sensor identifier identifying the IoT-enabled device;
   determining, by the computing device, wireless proximity product exposure data from the received communications, the wireless proximity product exposure data comprising the sensor identifier and duration information indicating an amount of time in which the IoT-enabled device was within the wireless proximity of the computing device;
   transmitting, by the computing device, the wireless proximity product exposure data to a server device, wherein the wireless proximity product exposure data is compiled with previous product exposure data for a plurality of IoT-enabled devices to which the computing device was previously exposed to determine a frequency of wireless proximity product exposure to a product corresponding to the IoT-enabled device over a period of time;
   determining, at the server device, a comprehensive targeting profile for a user of the computing device, the comprehensive targeting profile indicating one or more interests of the user according to at least the compiled wireless proximity product exposure data; and
   receiving, at the computing device and from the server device, an electronic communication targeted for the user of the computing device, wherein the electronic communication comprises content promoting the product corresponding to the IoT-enabled device, wherein the electronic communication is received once the frequency of wireless proximity product exposure to the product corresponding to the IoT-enabled device increases over a threshold value, and wherein the electronic communication is tailored to the one or more interests indicated in the comprehensive targeting profile.

2. The computer-implemented method of claim 1, wherein the computing device comprises a smart phone, and the IoT enabled device comprises a smartphone, a tablet computer, a laptop computer, wearable technology, or a device comprising an IoT sensor.

3. The computer-implemented method of claim 1, wherein the electronic communication is received only if the IoT-enabled device satisfies a threshold condition.

4. The computer-implemented method of claim 3, wherein the threshold condition includes whether the IoT-enabled device has been purchased a minimum number of times within a geographic area of the user.

5. The computer-implemented method of claim 3, wherein the threshold condition includes whether the content promoting the IoT-enabled device has already been received by the computing device.

6. The computer-implemented method of claim 3, wherein the threshold condition includes whether the IoT-enabled device is on sale within a geographic location of the user.

7. The computer-implemented method of claim 1, wherein the threshold value is based on a product category for the IoT-enabled device, wherein the threshold value is different for a first product category compared to a second product category.

8. A computer-implemented method for transmitting a targeted communication to a computing device based on a frequency of exposure of IoT-enabled devices near the computing device over a period of time, the method comprising:
  detecting, at the computing device, an IOT-enabled device entering within a wireless proximity of the computing device, wherein the wireless proximity comprises a communication range of a wireless networking protocol;
  receiving, at a server device, wireless proximity product exposure data from the computing device, the wireless proximity product exposure data comprising a sensor identifier identifying an IoT-enabled device that entered within a wireless proximity of the computing device and further comprising duration information indicating an amount of time in which the IoT-enabled device was within wireless proximity of the computing device;
  compiling, by the server device, the wireless proximity product exposure data with previous product exposure data for a plurality of IoT-enabled devices to which the computing device was previously exposed, the wireless proximity product exposure data and the previous product exposure data compiled into compiled wireless proximity product exposure data;
  determining, by the server device and based on the compiled wireless proximity product exposure data, a frequency of exposure to a product corresponding to the IoT-enabled device over the period of time;
  determining, by the server device, a comprehensive targeting profile for a user of the computing device, the comprehensive targeting profile indicating one or more interests of the user according to at least the compiled wireless proximity product exposure data; and
  transmitting, from the server device, an electronic communication comprising content promoting the product corresponding to the IoT-enabled device to the computing device in response to determining that the frequency of exposure to the product corresponding to the IoT-enabled device is greater than a threshold value, wherein the electronic communication is tailored to the one or more interests indicated in the comprehensive targeting profile.

9. The computer-implemented method of claim 8, wherein determining the frequency of exposure to the product corresponding to the IoT-enabled device over the period of time comprises determining a number of entries of the compiled product exposure data collected during the period of time that include sensor identifiers corresponding to the IoT-enabled device.

10. The computer-implemented method of claim 8, wherein the IoT-enabled device comprises an IoT sensor.

11. The computer-implemented method of claim 8, wherein the electronic communication is transmitted only if the IoT-enabled device satisfies a threshold condition.

12. The computer-implemented method of claim 11, wherein the threshold condition includes whether the IoT-enabled device has been purchased a minimum number of times within a geographic area of the user.

13. The computer-implemented method of claim 11, wherein the threshold condition includes whether content promoting the IoT-enabled device has already been transmitted to the computing device.

14. The computer-implemented method of claim 11, wherein the threshold condition includes whether the IoT-enabled device is on sale within a geographic location of the user.

15. The computer-implemented method of claim 8, wherein the threshold value is based on a product category the IoT-enabled device, wherein the threshold value is different for a first product category compared to a second product category.

16. A system for transmitting a targeted communication to a computing device based on a frequency of exposure of IoT-enabled devices near the computing device over a period of time, the system comprising:
  a processor; and
  a memory communicatively coupled to the processor, wherein the processor is configured to execute instructions included in the memory device to perform operations comprising:
    receiving, at a server device, wireless proximity product exposure data from the computing device, the wireless proximity product exposure data comprising a sensor identifier identifying an IoT-enabled device that entered within a wireless proximity of the computing device and further comprising duration information indicating an amount of time in which the IoT-enabled device was within wireless proximity of the computing device, wherein the wireless proximity comprises a communication range of a wireless networking protocol;
    compiling, by the server device, the wireless proximity product exposure data with previous product exposure data for a plurality of IoT-enabled devices to which the computing device was previously exposed, the wireless proximity product exposure data and the previous product exposure data compiled into compiled wireless proximity product exposure data;
    determining, by the server device and based on the compiled wireless proximity product exposure data, a frequency of exposure to a product corresponding to the IoT-enabled device over the period of time;
    determining, by the server device, a comprehensive targeting profile for a user of the computing device, the comprehensive targeting profile indicating one or more interests of the user according to at least the compiled wireless proximity product exposure data; and
    transmitting, from the server device, an electronic communication comprising content promoting the IoT-enabled device to the computing device in response to determining that the frequency of exposure to the product corresponding to the IoT-enabled device is greater than a threshold value, wherein the electronic communication is tailored to the one or more interests indicated in the comprehensive targeting profile.

17. The system of claim 16, wherein determining the frequency of exposure to the product corresponding to the IoT-enabled device over the period of time comprises determining a number of entries of the compiled product exposure data collected during the period of time that include sensor identifiers corresponding to the IoT-enabled device.

18. The system of claim 16, wherein the computing device comprises a personal computing device carried or worn by the user.

19. The system of claim 16, wherein the electronic communication is transmitted only if the IoT-enabled device satisfies a threshold condition.

20. The system of claim 19, wherein the threshold condition includes whether the IoT-enabled device has been purchased a minimum number of times within a geographic area of the user.

* * * * *